US012609067B2

(12) United States Patent
Crounse

(10) Patent No.: US 12,609,067 B2
(45) **Date of Patent: *Apr. 21, 2026**

(54) ELECTRO-OPTIC DISPLAYS, AND METHODS FOR DRIVING SAME

(71) Applicant: E INK CORPORATION, Billerica, MA (US)

(72) Inventor: Kenneth R. Crounse, Somerville, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/219,410

(22) Filed: May 27, 2025

(65) Prior Publication Data

US 2025/0285575 A1 Sep. 11, 2025

Related U.S. Application Data

(60) Continuation of application No. 18/092,726, filed on Jan. 3, 2023, now Pat. No. 12,347,356, which is a division of application No. 17/334,751, filed on May 30, 2021, now Pat. No. 11,568,786.

(60) Provisional application No. 63/032,721, filed on May 31, 2020.

(51) Int. Cl.

| | |
|---|---|
| ***G09G 3/20*** | (2006.01) |
| ***G09G 3/34*** | (2006.01) |
| ***G09G 3/38*** | (2006.01) |

(52) U.S. Cl.

CPC ........... *G09G 3/2007* (2013.01); *G09G 3/344* (2013.01); *G09G 3/3453* (2013.01); *G09G 3/348* (2013.01); *G09G 3/38* (2013.01); *G09G 2310/06* (2013.01); *G09G 2320/0257* (2013.01); *G09G 2320/029* (2013.01)

(58) Field of Classification Search

CPC .... G09G 3/2007; G09G 3/344; G09G 3/3453; G09G 3/38; G09G 2310/06; G09G 2320/0257; G09G 2320/029

See application file for complete search history.

(56) References Cited

U.S. PATENT DOCUMENTS

| | | | | |
|---|---|---|---|---|
| 7,119,772 | B2 | 10/2006 | Amundson et al. | |
| 7,952,557 | B2 | 5/2011 | Amundson | |
| 8,878,770 | B2 * | 11/2014 | Miyazaki | G09G 3/344 345/107 |
| 9,024,862 | B2 | 5/2015 | Rhodes | |
| 10,163,406 | B2 | 12/2018 | Sim et al. | |
| 10,380,931 | B2 | 8/2019 | Lin et al. | |
| 10,444,592 | B2 | 10/2019 | Bouchard | |
| 10,657,869 | B2 | 5/2020 | Telfer et al. | |

(Continued)

OTHER PUBLICATIONS

Korean Intellectual Property Office, “International Search Report and Written Opinion”, PCT/US2021/035050, Sep. 16, 2021.

(Continued)

*Primary Examiner* — Michael A Faragalla

(74) *Attorney, Agent, or Firm* — Jason P. Colangelo

(57) ABSTRACT

There are provided methods for driving an electro-optic display having a plurality of display pixels, a such method includes detecting a white-to-white graytone transition on a first pixel; and determining whether a threshold number of cardinal neighbors of the first pixel are not making a graytone transition from white to white, or if the first pixel is a color pixel, and apply a first waveform.

10 Claims, 8 Drawing Sheets

(56) References Cited

U.S. PATENT DOCUMENTS

| | | | |
|---|---|---|---|
| 10,672,350 B2 | 6/2020 | Amundson et al. | |
| 10,810,971 B2 | 10/2020 | Clarke et al. | |
| 11,030,936 B2 | 6/2021 | Emelie et al. | |
| 11,423,852 B2 | 8/2022 | Sim et al. | |
| 11,721,295 B2 | 8/2023 | Sim et al. | |
| 2011/0285713 A1* | 11/2011 | Swic | H04N 9/68 345/428 |
| 2011/0316889 A1* | 12/2011 | Rhodes | G09G 3/344 345/690 |
| 2016/0133196 A1 | 5/2016 | Emelie et al. | |
| 2016/0225322 A1* | 8/2016 | Sim | G09G 3/344 |

OTHER PUBLICATIONS

European Patent Office, "Extended European Search Report", EP Appl. No. 21818816.7, Aug. 12, 2024.

* cited by examiner

400

ELECTRO-OPTIC DISPLAYS, AND METHODS FOR DRIVING SAME

CROSS-REFERENCE TO RELATED APPLICATIONS

This application is a continuation of U.S. patent application Ser. No. 18/092,726, filed Jan. 3, 2023, which is a division of U.S. patent application Ser. No. 17/334,751, filed May 30, 2021, which claims priority to U.S. Provisional Application No. 63/032,721 filed on May 31, 2020.

The entire disclosures of the aforementioned applications are herein incorporated by reference. Further, the entire contents of any patent, published application, or other published work referenced herein are incorporated by reference in their entireties

FIELD OF THE INVENTION

This invention relates to methods for driving electro-optic displays. More specifically, this invention relates to driving methods for reducing pixel edge artifacts and/or image retentions in electro-optic displays.

BACKGROUND

Electro-optic displays typically have a backplane provided with a plurality of pixel electrodes each of which defines one pixel of the display; conventionally, a single common electrode extending over a large number of pixels, and normally the whole display is provided on the opposed side of the electro-optic medium. The individual pixel electrodes may be driven directly (i.e., a separate conductor may be provided to each pixel electrode) or the pixel electrodes may be driven in an active matrix manner which will be familiar to those skilled in backplane technology. Since adjacent pixel electrodes will often be at different voltages, they must be separated by inter-pixel gaps of finite width in order to avoid electrical shorting between electrodes. Although at first glance it might appear that the electro-optic medium overlying these gaps would not switch when drive voltages are applied to the pixel electrodes (and indeed, this is often the case with some non-bistable electro-optic media, such as liquid crystals, where a black mask is typically provided to hide these non-switching gaps), in the case of many bistable electro-optic media the medium overlying the gap does switch because of a phenomenon known as "blooming".

Blooming refers to the tendency for application of a drive voltage to a pixel electrode to cause a change in the optical state of the electro-optic medium over an area larger than the physical size of the pixel electrode. Although excessive blooming should be avoided (for example, in a high resolution active matrix display one does not wish application of a drive voltage to a single pixel to cause switching over an area covering several adjacent pixels, since this would reduce the effective resolution of the display) a controlled amount of blooming is often useful. For example, consider a black-on-white electro-optic display which displays numbers using a conventional seven-segment array of seven directly driven pixel electrodes for each digit. When, for example, a zero is displayed, six segments are turned black. In the absence of blooming, the six inter-pixel gaps will be visible. However, by providing a controlled amount of blooming, for example as described in U.S. Pat. No. 7,602,374, which is incorporated herein in its entirety, the inter-pixel gaps can be made to turn black, resulting in a more visually pleasing digit. However, blooming can lead to a problem denoted "edge ghosting".

An area of blooming is not a uniform white or black but is typically a transition zone where, as one moves across the area of blooming, the color of the medium transitions from white through various shades of gray to black. Accordingly, an edge ghost will typically be an area of varying shades of gray rather than a uniform gray area, but can still be visible and objectionable, especially since the human eye is well equipped to detect areas of gray in monochrome images where each pixel is supposed to be pure black or pure white.) [Para 24] In some cases, asymmetric blooming may contribute to edge ghosting. "Asymmetric blooming" refers to a phenomenon whereby in some electro-optic media (for example, the copper chromite/titania encapsulated electrophoretic media described in U.S. Pat. No. 7,002,728, which is incorporated herein in its entirety) the blooming is "asymmetric" in the sense that more blooming occurs during a transition from one extreme optical state of a pixel to the other extreme optical state than during a transition in the reverse direction; in the media described in this patent, typically the blooming during a black-to-white transition is greater than that during a white-to-black one.

As such, driving methods that also reduces the ghosting or blooming effects are needed.

SUMMARY OF THE INVENTION

Accordingly, in one aspect, the subject matter presented herein provides for a method for driving an electro-optic display having a plurality of display pixels, the method can include detecting a white-to-white graytone transition on a first pixel, and determining whether a threshold number of cardinal neighbors of the first pixel are not making a graytone transition from white to white, or if the first pixel is a color pixel, and apply a first waveform.

In some embodiments, the driving method may further include determining whether all four cardinal neighbors of the first pixel have a next graytone of white and at least one cardinal neighbor of the first pixel has a current gray tone of not white, and apply a second waveform.

In another embodiment, the driving method can also include determining whether all four cardinal neighbors of the first pixel have a next graytone of white and at least one cardinal neighbor of the first pixel has a graytone transition of white-to-white and is a color pixel, and apply a second wave form.

In yet another embodiment, the driving method may include determining whether all four cardinal neighbors of the first pixel have a next graytone of white and at least one cardinal neighbor of the first pixel has a current gray tone of not white and an empty prior pixel transition, and apply a second waveform.

In another embodiment, the driving method can include determining whether all four cardinal neighbors of the first pixel have a next graytone of white and at least one cardinal neighbor of the first pixel has a graytone transition of white-to-white and is a color pixel, and apply a second waveform.

In some embodiments, the first waveform may include a first component configured to drive the first pixel to an optical black state.

In some other embodiments, the first waveform may include a second component configured to drive the first pixel to an optical white state.

In some embodiments, the second waveform can include a top-off pulse.

In some other embodiments, the second waveform can include a twiddle pulse.

In another aspect, the subject matter presented herein provides for another method for driving electro-optic displays, the method can include color mapping a source image to a color mapped image for the electro-optic display, identifying color pixels from the color mapped image and flagging the color pixels with a designator, and using the color pixel identification data as input for a waveform generating algorithm.

In some embodiments, this driving method can also include performing a color filter array mapping on the color mapped image.

In another embodiment, this driving method can further include generating waveforms for a next state image from the waveform generating algorithm.

In yet another embodiment, this driving method may also include using the generated waveforms as current state image for a next state image.

DETAILED DESCRIPTION

Figure 1:
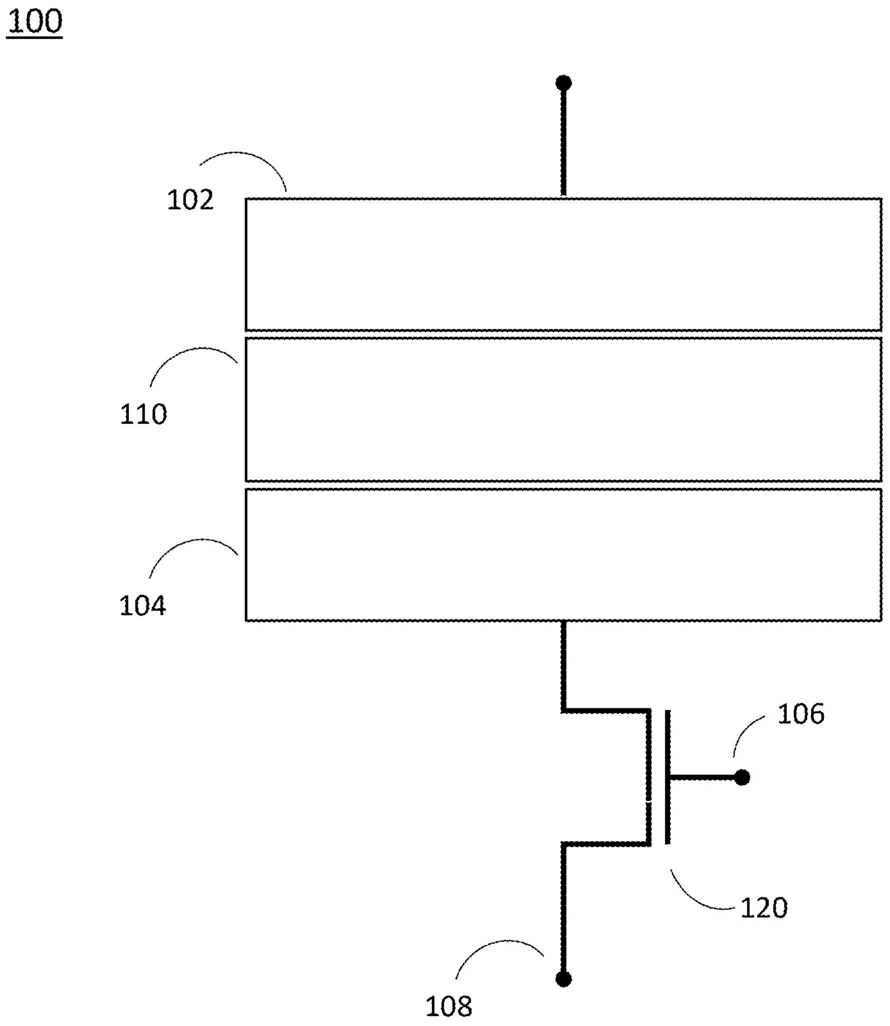
FIG. 1 is a circuit diagram representing an electrophoretic display.

The present invention relates to methods for driving electro-optic displays, especially bistable electro-optic displays, and to apparatus for use in such methods. More specifically, this invention relates to driving methods which may allow for reduced "ghosting" and edge effects, and reduced flashing in such displays. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example, the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18 (3), 24 (March 2002). See also Bach, U., et al., Adv. Mater., 2002, 14 (11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 7,072,095 and 9,279,906;
(d) Methods for filling and sealing microcells; see for example U.S. Pat. Nos. 7,144,942 and 7,715,088;
(e) Films and sub-assemblies containing electro-optic materials; see for example U.S. Pat. Nos. 6,982,178 and 7,839,564;
(f) Backplanes, adhesive layers and other auxiliary layers and methods used in displays; see for example U.S. Pat. Nos. 7,116,318 and 7,535,624;
(g) Color formation and color adjustment; see for example U.S. Pat. Nos. 7,075,502 and 7,839,564.
(h) Applications of displays; see for example U.S. Pat. Nos. 7,312,784; 8,009,348;
(i) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710; and
(j) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414;

8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display." In a microcell electrophoretic display, the charged particles and the suspending fluid are not encapsulated within microcapsules but instead are retained within a plurality of cavities formed within a carrier medium, e.g., a polymeric film. See, for example, International Application Publication No. WO 02/01281, and published U.S. Application No. 2002/0075556, both assigned to Sipix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

Another type of electro-optic display is an electro-wetting display developed by Philips and described in Hayes, R. A., et al., "Video-Speed Electronic Paper Based on Electrowetting," Nature, 425, 383-385 (2003). It is shown in copending application Ser. No. 10/711,802, filed Oct. 6, 2004, that such electro-wetting displays can be made bistable.

Other types of electro-optic materials may also be used. Of particular interest, bistable ferroelectric liquid crystal displays (FLCs) are known in the art and have exhibited remnant voltage behavior.

Although electrophoretic media may be opaque (since, for example, in many electrophoretic media, the particles substantially block transmission of visible light through the display) and operate in a reflective mode, some electrophoretic displays can be made to operate in a so-called "shutter mode" in which one display state is substantially opaque and one is light-transmissive. See, for example, the patents U.S. Pat. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

A high-resolution display may include individual pixels which are addressable without interference from adjacent pixels. One way to obtain such pixels is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. When the non-linear element is a transistor, the pixel electrode may be connected to the drain of the transistor, and this arrangement will be assumed in the following description, although it is essentially arbitrary and the pixel electrode could be connected to the source of the transistor. In high-resolution arrays, the pixels may be arranged in a two-dimensional array of rows and columns, such that any specific pixel is uniquely defined by the intersection of one specified row and one specified column. The sources of all the transistors in each column may be connected to a single column electrode, while the gates of all the transistors in each row may be connected to a single row electrode; again the assignment of sources to rows and gates to columns may be reversed if desired.

The display may be written in a row-by-row manner. The row electrodes are connected to a row driver, which may apply to a selected row electrode a voltage such as to ensure that all the transistors in the selected row are conductive, while applying to all other rows a voltage such as to ensure that all the transistors in these non-selected rows remain non-conductive. The column electrodes are connected to column drivers, which place upon the various column electrodes voltages selected to drive the pixels in a selected row to their desired optical states. (The aforementioned voltages are relative to a common front electrode which may be provided on the opposed side of the electro-optic medium from the non-linear array and extends across the whole display. As in known in the art, voltage is relative and a measure of a charge differential between two points. One voltage value is relative to another voltage value. For example, zero voltage ("0V") refers to having no voltage differential relative to another voltage.) After a pre-selected interval known as the "line address time," a selected row is deselected, another row is selected, and the voltages on the column drivers are changed so that the next line of the display is written.

However, in use, certain waveforms may produce a remnant voltage to pixels of an electro-optic display, and as evident from the discussion above, this remnant voltage produces several unwanted optical effects and is in general undesirable.

As presented herein, a "shift" in the optical state associated with an addressing pulse refers to a situation in which a first application of a particular addressing pulse to an electro-optic display results in a first optical state (e.g., a first gray tone), and a subsequent application of the same addressing pulse to the electro-optic display results in a second optical state (e.g., a second gray tone). Remnant voltages may give rise to shifts in the optical state because the voltage applied to a pixel of the electro-optic display during application of an addressing pulse includes the sum of the remnant voltage and the voltage of the addressing pulse.

A "drift" in the optical state of a display over time refers to a situation in which the optical state of an electro-optic display changes while the display is at rest (e.g., during a period in which an addressing pulse is not applied to the display). Remnant voltages may give rise to drifts in the optical state because the optical state of a pixel may depend on the pixel's remnant voltage, and a pixel's remnant voltage may decay over time.

As discussed above, "ghosting" refers to a situation in which, after the electro-optic display has been rewritten, traces of the previous image(s) are still visible. Remnant voltages may give rise to "edge ghosting," a type of ghosting in which an outline (edge) of a portion of a previous image remains visible.

An Exemplary EPD

FIG. 1 shows a schematic of a pixel 100 of an electro-optic display in accordance with the subject matter submitted herein. Pixel 100 may include an imaging film 110. In some embodiments, imaging film 110 may be bistable. In some embodiments, imaging film 110 may include, without limitation, an encapsulated electrophoretic imaging film, which may include, for example, charged pigment particles.

Imaging film 110 may be disposed between a front electrode 102 and a rear electrode 104. Front electrode 102 may be formed between the imaging film and the front of the display. In some embodiments, front electrode 102 may be transparent. In some embodiments, front electrode 102 may be formed of any suitable transparent material, including, without limitation, indium tin oxide (ITO). Rear electrode 104 may be formed opposite a front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments, non-linear element 120 may include a diode and/or a transistor, including, without limitation, a MOSFET. The drain (or source) of the MOSFET may be coupled to back-plate electrode 104, the source (or drain) of the MOSFET may be coupled to addressing electrode 108, and the gate of the MOSFET may be coupled to a driver electrode 106 configured to control the activation and deactivation of the MOSFET. (For simplicity, the terminal of the MOSFET coupled to back-plate electrode 104 will be referred to as the MOSFET's drain, and the terminal of the MOSFET coupled to addressing electrode 108 will be referred to as the MOSFET's source. However, one of ordinary skill in the art will recognize that, in some embodiments, the source and drain of the MOSFET may be interchanged.)

In some embodiments of the active matrix, the addressing electrodes 108 of all the pixels in each column may be connected to a same column electrode, and the driver electrodes 106 of all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In some embodiments, the pixels 100 of the active matrix may be written in a row-by-row manner. For example, a row of pixels may be selected by the row driver, and the voltages corresponding to the desired optical states for the row of pixels may be applied to the pixels by the column drivers. After a pre-selected interval known as the "line address time," the selected row may be deselected, another row may be selected, and the voltages on the column drivers may be changed so that another line of the display is written.

Figure 2:
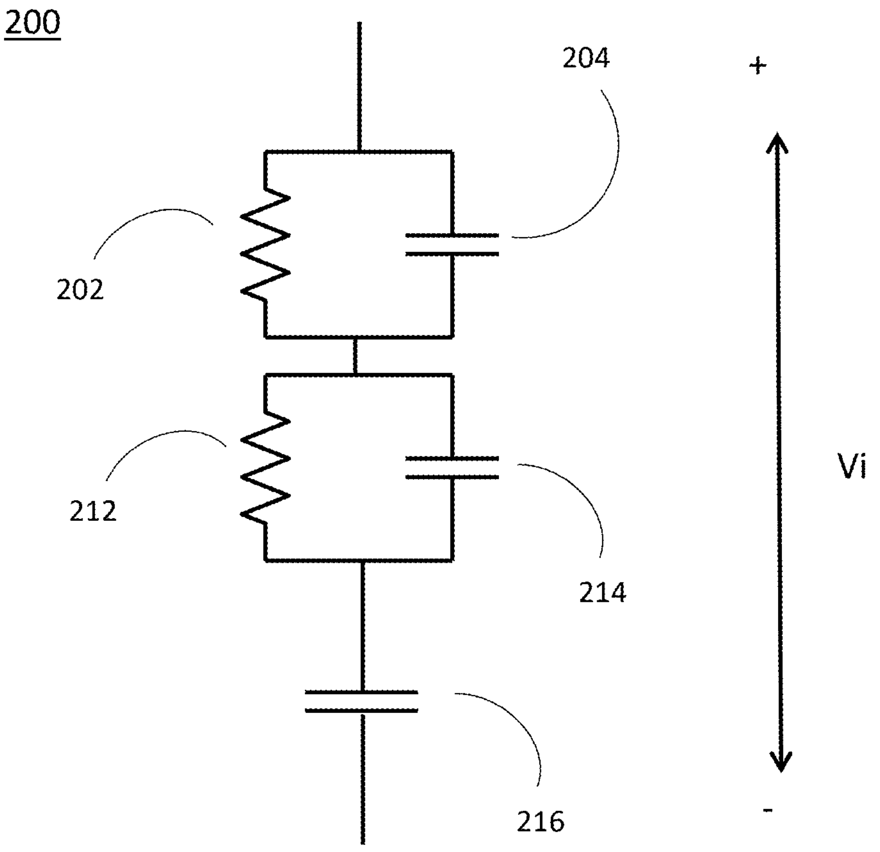
FIG. 2 shows a circuit model of the electro-optic imaging layer.

FIG. 2 shows a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the backplane electrode. A voltage Vi across a pixel's imaging film 110 may include the pixel's remnant voltage.

In use, it is desirable for an electro-optic display as illustrated in FIGS. 1 and 2 to update to a subsequent image without flashing the display's background. However, the straightforward method of using an empty transition in image updating for a background color to background color (e.g., white-to-white, or black-to-black) waveform may lead to the build-up of edge artifacts (e.g., bloomings). In a black and white electro-optic display, the edge artifacts may be reduced top off waveforms illustrated in FIGS. 4A and 4B. However, in an electro-optic display such as an electrophoretic display (EPD) with colors generated using a color filter array (CFA), maintaining color quality and contrast may be challenging sometimes.

Figure 3:
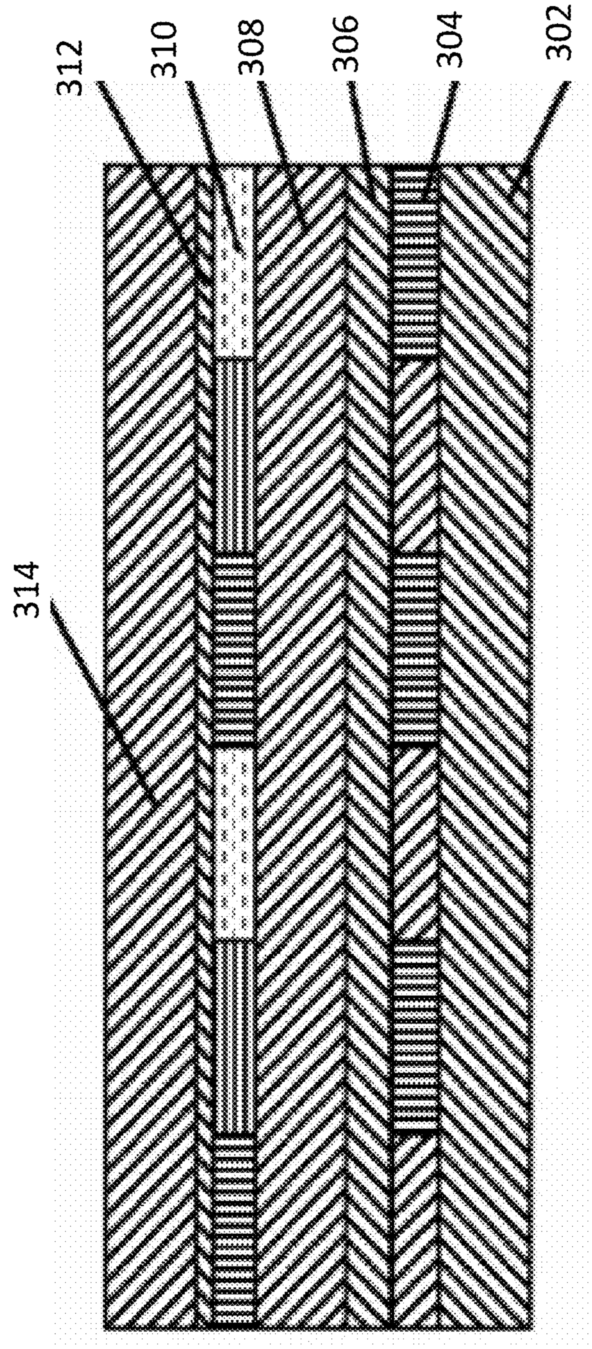
FIG. 3 illustrates a cross sectional view of an electro-optic display having a colored filter array.

FIG. 3 illustrates a cross sectional view of a CFA based colored EPD in accordance with the subject matter disclosed herein. As shown in FIG. 3, a color electrophoretic display (generally designated 300) comprising a backplane 302 bearing a plurality of pixel electrodes 304. To this backplane 302 may be laminated an inverted front plane laminate, this inverted front plane laminate may comprise a monochrome electrophoretic medium layer 306 having black and white extreme optical states, an adhesive layer 308, a color filter array 310 having red, green and blue areas aligned with the pixel electrodes 304, a substantially transparent conductive layer 312 (typically formed from indium-tin-oxide, no) and a front protective layer 314.

In use, in a CFA based colored EPD, any color area in an image will result in a modulation of the pixels behind each CFA element. For example, the best red color is obtained when the red CFA pixels are turned on (e.g., turned to white) and the green and blue CFA pixels are turned off (e.g., black). Any blooming into the white pixels may cause a reduction in the chromaticity and brightness of the red color. Explained in more details below are algorithms where one may identify and reduce the above mentioned edge artifacts (e.g., blooming) without sacrifice color saturation.

EPD Driving Schemes

In some applications, a display may make use of a "direct update" drive scheme ("DUDS). The DUDS may have two or more than two gray levels, typically fewer than a gray scale drive scheme ("GSDS), which can effect transitions between all possible gray levels, but the most important characteristic of a DUDS is that transitions are handled by a simple unidirectional drive from the initial gray level to the final gray level, as opposed to the "indirect" transitions often used in a GSDS, where in at least some transitions the pixel is driven from an initial gray level to one extreme optical state, then in the reverse direction to a final gray level; in some cases, the transition may be effected by driving from the initial gray level to one extreme optical state, thence to the opposed extreme optical state, and only then to the final extreme optical state-see, for example, the drive scheme illustrated in FIGS. 11A and 11B of the aforementioned U.S. Pat. No. 7,012,600. Thus, present electrophoretic displays may have an update time in grayscale mode of about two to three times the length of a saturation pulse (where "the length of a saturation pulse" is defined as the time period, at a specific voltage, that suffices to drive a pixel of a display from one extreme optical state to the other), or approximately 700-900 milliseconds, whereas a DUDS has a maximum update time equal to the length of the saturation pulse, or about 200-300 milliseconds.

Variation in drive schemes is, however, not confined to differences in the number of gray levels used. For example, drive schemes may be divided into global drive schemes, where a drive voltage is applied to every pixel in the region to which the global update drive scheme (more accurately referred to as a "global complete" or "GC" drive scheme) is being applied (which may be the whole display or some defined portion thereof) and partial update drive schemes, where a drive voltage is applied only to pixels that are undergoing a non-zero transition (i.e., a transition in which the initial and final gray levels differ from each other), but no drive voltage is applied during zero transitions (in which the initial and final gray levels are the same). An intermediate form a drive scheme (designated a "global limited" or "GL" drive scheme or drive mode) is similar to a GC drive scheme except that no drive voltage is applied to a pixel which is undergoing a zero, white-to-white transition. In, for example, a display used as an electronic book reader, displaying black text on a white background, there are numerous white pixels, especially in the margins and between lines of text which remain unchanged from one page of text to the next; hence, not rewriting these white pixels substantially reduces the apparent "flashiness" of the display rewriting. However, certain problems remain in this type of GL drive scheme. Firstly, as discussed in detail in some of the aforementioned MEDEOD applications, bistable electro-optic media are typically not completely bistable, and pixels placed in one extreme optical state gradually drift, over a period of minutes to hours, towards an intermediate gray level. In particular, pixels driven white slowly drift towards a light gray color. Hence, if in a GL drive scheme a white pixel is allowed to remain undriven through a number of page turns, during which other white pixels (for example, those forming parts of the text characters) are driven, the freshly updated white pixels will be slightly lighter than the undriven white pixels, and eventually the difference will become apparent even to an untrained user.

Secondly, when an un-driven pixel lies adjacent a pixel which is being updated, a phenomenon known as "blooming" occurs, in which the driving of the driven pixel causes a change in optical state over an area slightly larger than that of the driven pixel, and this area intrudes into the area of adjacent pixels. Such blooming manifests itself as edge effects along the edges where the un-driven pixels lie adjacent driven pixels. Similar edge effects occur when using regional updates (where only a particular region of the display is updated, for example to show an image), except that with regional updates the edge effects occur at the boundary of the region being updated. Over time, such edge effects become visually distracting and must be cleared. Hitherto, such edge effects (and the effects of color drift in un-driven white pixels) have typically been removed by using a single GC update at intervals. Unfortunately, use of such an occasional GC update reintroduces the problem of a "flashy" update, and indeed the flashiness of the update may be heightened by the fact that the flashy update only occurs at long intervals.

Edge Artifact Reduction

Figure 4A:
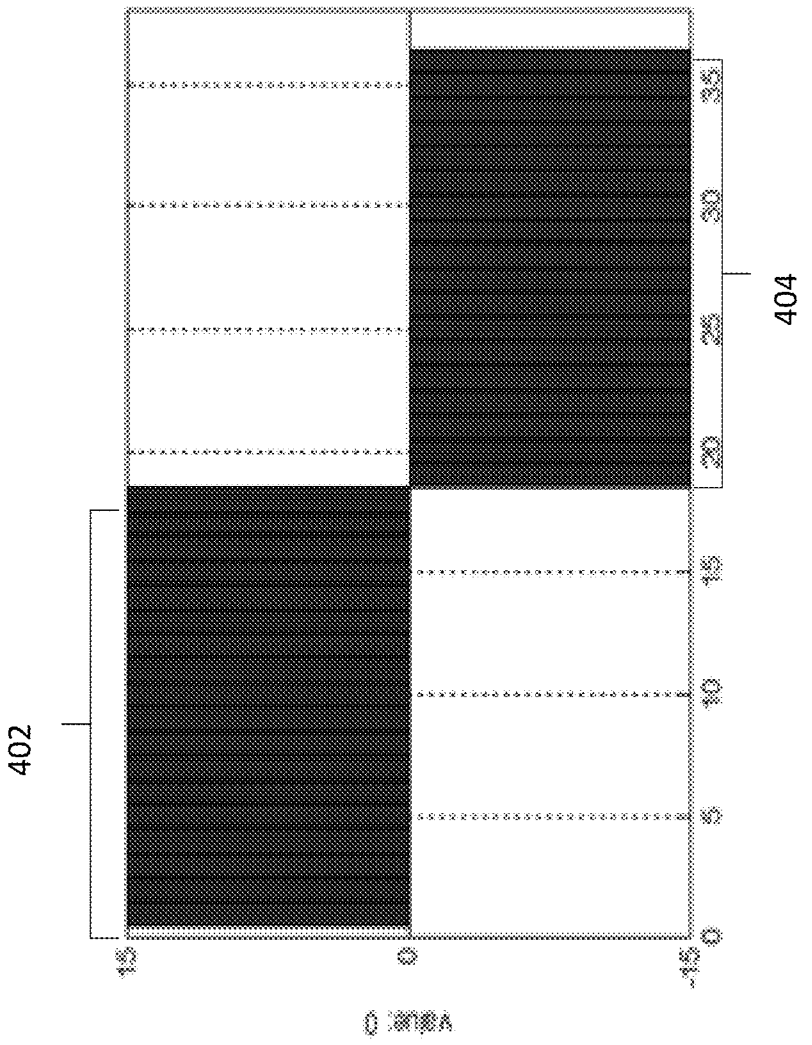
FIG. 4A illustrates an exemplary clearing waveform in accordance with the subject matter disclosed herein.

In practice, optical edge artifacts in pixels may be reduced using several driving methods or algorithms. For example, one may first identify a pixel going through a white-to-white transition with cardinal neighboring pixels that are going through non empty transitions, and depending on how many of such cardinal pixels are going through such transitions, a full clearing waveform, such as the one illustrated in FIG. 4A, may be applied to the pixel going through a white-to-white transition. Where deciding the exact number of neighboring cardinal pixels before a full clearing waveform is to be applied may be designed to achieve optimal display quality depending on specific applications. As illustrated in FIG. 4A, a full clearing or "F" waveform may include two full, long pulses designed to drive a display pixel to black and/or white. For example, a first portion 402 with a duration of 18 frames and a magnitude of 15 volts configured to drive the display pixel to black, followed by a second portion 404 with a duration of 18 frames and a magnitude of negative 15 volts configured to drive the display pixel to white.

Below are some driving methods and/or algorithms that may be adopted to reduce pixel edge artifacts.

Method 1

```
For all pixels in any order:
  If the pixel graytone transition is not W→W, Then apply the standard
GL transition;
  Else,
```

-continued

```
    If at least SFT cardinal neighbors are not making a graytone transition
from white to white OR isColorImagePixel, Then apply the F W→W
transition;
    Else,
    If all four cardinal neighbors have a next graytone of white, AND (At
least one cardinal neighbor has a current graytone not white OR At least one
cardinal neighbor is (graytone transition W→W AND isColorImagePixel))
Then apply the T W→W transition.
    Else Then use the empty (GL) W→W transition.
    End
```

In this driving method, a flag or designator (e.g., isColorImagePixel) is used to identify display pixels that are color pixels (i.e., color displaying pixels) in the source image (or alternatively in the color mapped image). In some embodiments, a color pixel can be a pixel that is not white in the source image. In practice, when an EPD is going from a white input image to a solid red area input image, every pixel under the red CFA will likely call for a white-to-white transition. As such, these pixels will be applied a full clearing or F W→W transition waveform, such as the one illustrated in FIG. 4A. In another embodiment, another indicator (e.g., SFT) may be used to determine whether or not to apply the full clearing or F W→W transition waveform, depending on how many cardinal or neighboring pixels are not going through a white-to-white transition. The exact threshold (e.g., SFT=3 or 2 etc.) for SFT can vary and may be determined depending on specific display conditions. All other pixels that are not going through a white-to-white transition may be applied a global limited or GL drive scheme or mode white transition (i.e., empty) waveform. Furthermore, a T W→W transition (i.e., twiddle T) waveforms may be applied to pixels that are flagged or designated to be a colored pixel. For example, if all four cardinal neighbors of a pixel have a next graytone of white, and at least one cardinal neighbor has a current graytone of not white, or, at least one cardinal neighbor has a white-to-white graytone transition and is a colored pixel under the CFA, then apply the T white-to-white transition. It should be appreciated that this driving method does not require the knowledge of the current waveform state of the current image, but instead needs only the graytone states of the current input image.

Figure 4B:
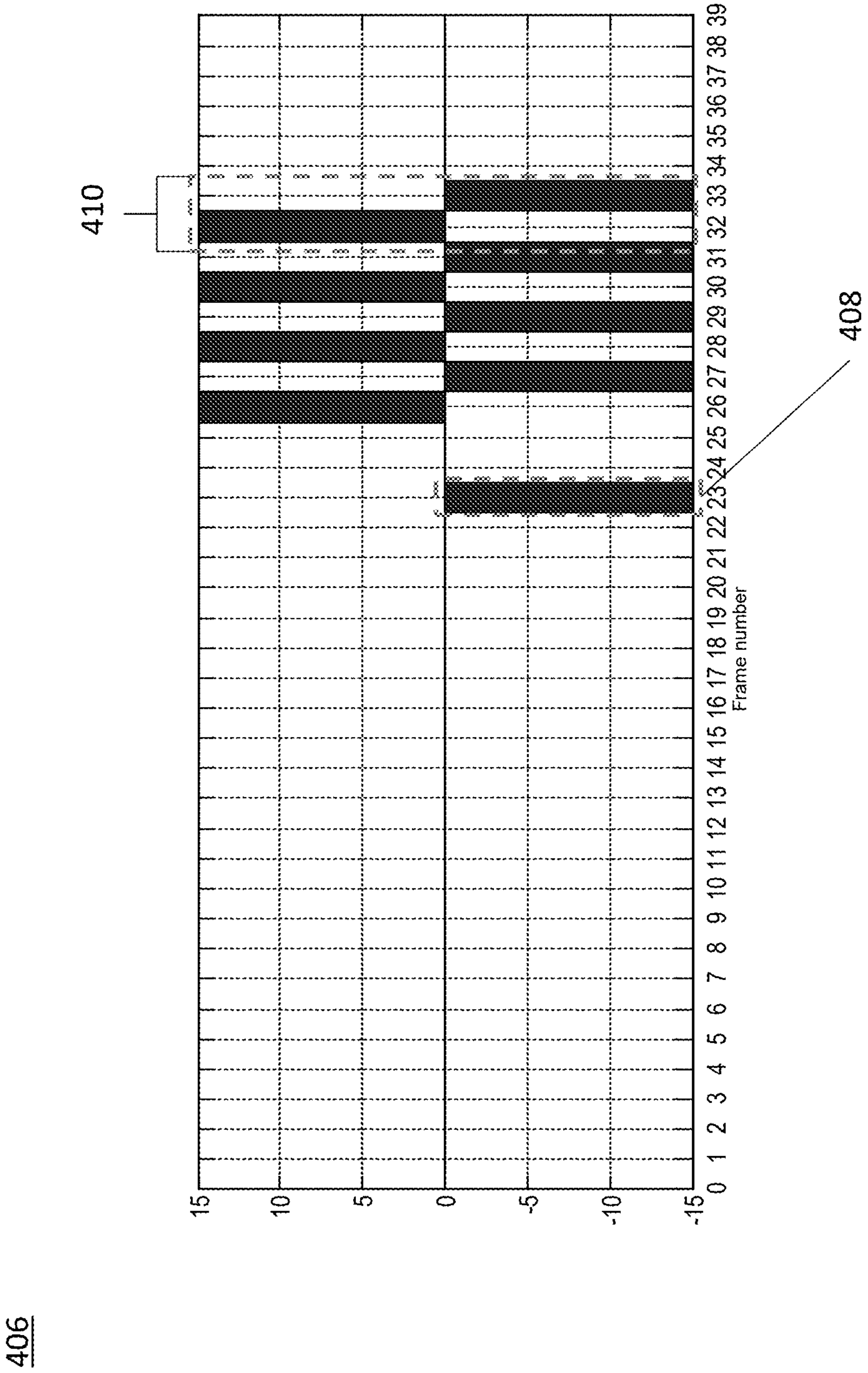
FIG. 4B illustrates an exemplary T W→W transition waveform in accordance with the subject matter disclosed herein.

FIG. 4B illustrates an exemplary T W→W transition waveform 406. This TW→W transition waveform 406 can include a variable number of twiddle pulses 410 with a variable location inside the waveform 406, and a variable number of top-off pulses 408 with a variable location inside the waveform 406 relative to the twiddle pulses 410. In some embodiments, the single top-off pulse 408 corresponds to one frame of drive white with an amplitude of negative 15 volts, where the twiddle pulse 410 can include an one frame drive to black at 15 volts with an one frame drive to white at negative 15 volts. The twiddle pules 410 can repeat itself as illustrated in FIG. 4B for numerous repetitions, and the top-off pulse 408 can be located before the twiddle pulse 410, after the twiddle pulse 410, and/or in between the twiddle pulse 410.

Figure 5:
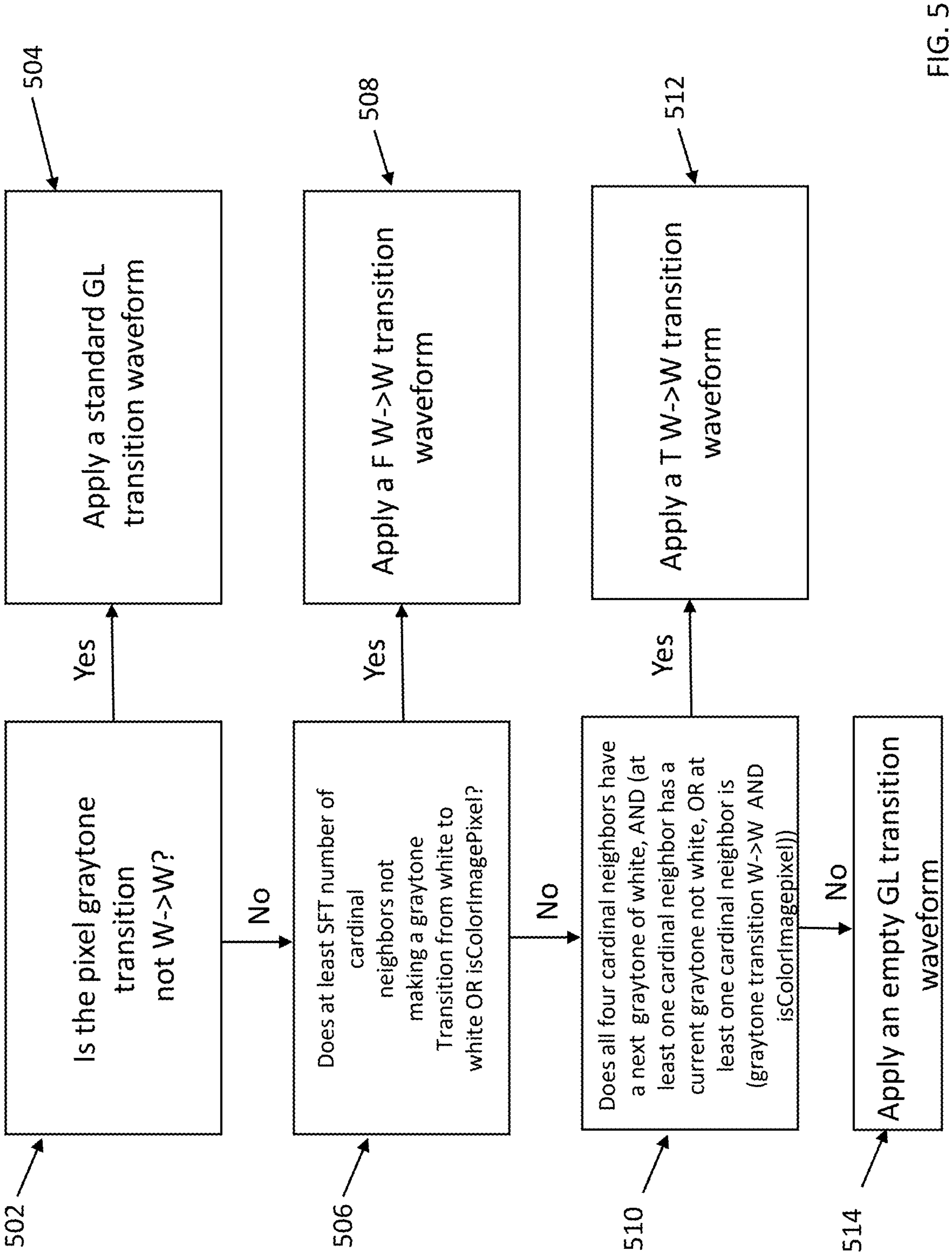
FIG. 5 is a flowchart illustrating a first algorithm for driving a display.

Referring now to FIG. 5, in practice, for all pixels of an electro-optic display, if the graytone transition for a display pixel of the display is not W→W (i.e., white-to-white), as indicated in step 502, then apply a waveform from the standard GL drive scheme or drive mode, as indicated in step 504; Else, in step 506, if at least SFT numbers of cardinal neighbors of this display pixel are not making a graytone transition from white to white, or is flagged with the isColorImagePixel designator (i.e., this particular display pixel is a color pixel in the source image (or alternatively in the color mapped image)), then apply a F W→W transition waveform (e.g., FIG. 4A), see step 508; Else, in step 510, if all four cardinal neighbors of the display pixel have a next graytone of white, and at least one cardinal neighbor has a current graytone of not white or at least one cardinal neighbor is of graytone transition white-to-white and is flagged as an isColorImagePixel pixel (i.e, is a color pixel), then apply a T W→W transition waveform (e.g., FIG. 4B), see step 512; else then apply an empty GL W→W transition waveform in step 514.

In some embodiments, a previous image state, or pixel state from a prior pixel transition may be added to the algorithm to determine which transition waveform to be applied, as illustrated in the driving method or algorithm below, as well as in FIG. 6. This algorithm maybe used to screen out pixels that have experienced non-empty transitions in the previous image update and instead does not apply the twiddle waveform.

Method 2

```
For all pixels in any order:
    If the pixel graytone transition is not W→W, Then apply the standard
GL transition
    Else
    If at least SFT cardinal neighbors are not making a graytone transition
from white to white OR isColorImagePixel, Then apply the F W→W
transition
    Else
    If all four cardinal neighbors have a next graytone of white, AND (At
least one cardinal neighbor has a current graytone not white AND prior pixel
transition was empty) OR At least one cardinal neighbor is (graytone transition
W→W AND isColorImagePixel) ), Then apply the T W→W transition.
    Else Then use the empty (GL) W→W transition.
End
```

This second method is similar to method 1 described above, but takes into account of the image graytone states from the currently displayed image. For pixels that had experienced non-empty transitions in the currently displayed image, twiddle waveform will not be applied for the subsequent image. This method may result in less power consumption for the EPD.

Figure 6:
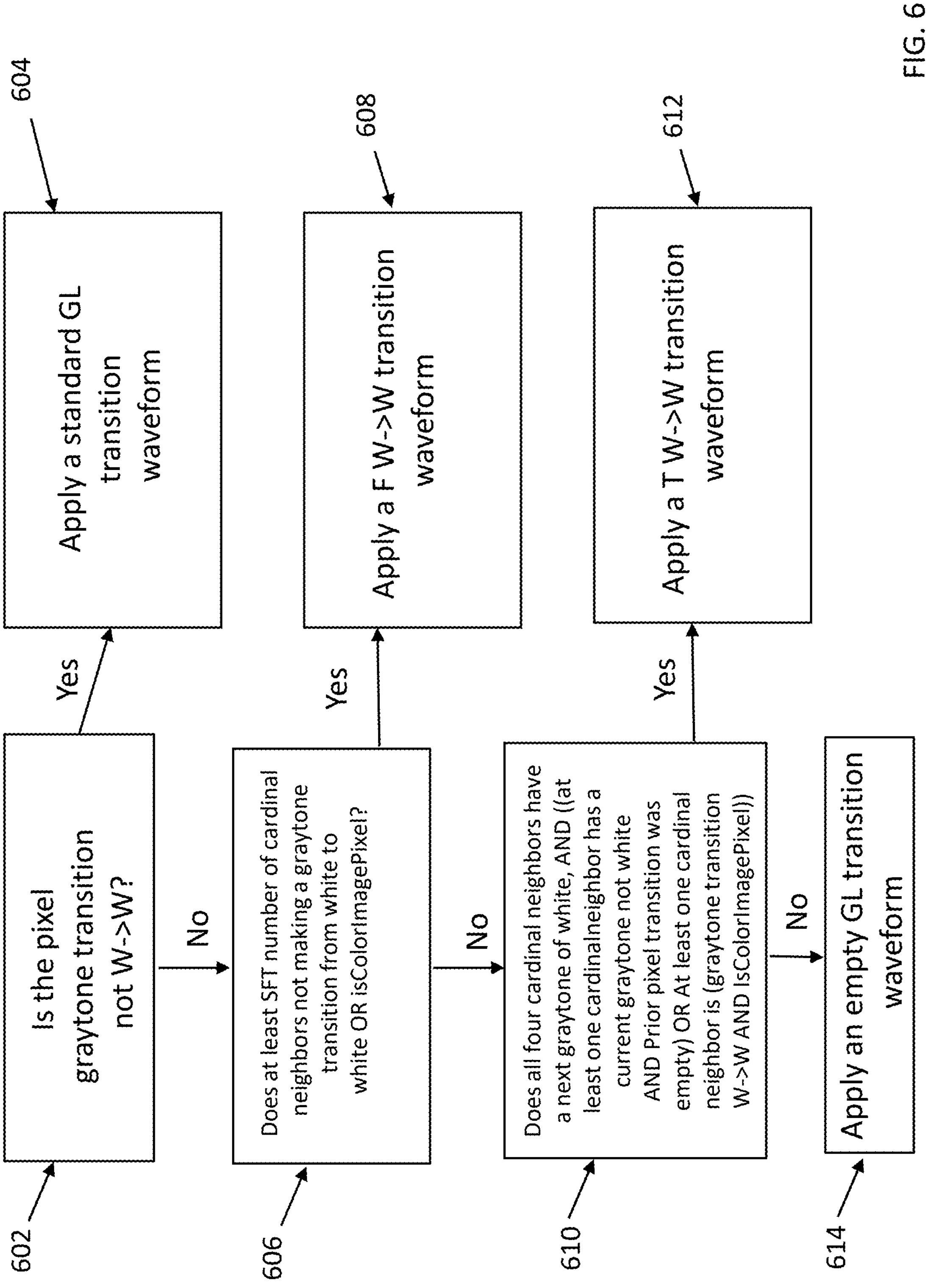
FIG. 6 is a flowchart illustrating a second algorithm for driving a display.

Referring now to FIG. 6, in practice, for all pixels of an electro-optic display, if the graytone transition for a display pixel of the display is not W→W (i.e., white-to-white), as indicated in step 602, then apply a waveform from the standard GL drive scheme or drive mode, as indicated in step 604; Else, in step 606, if at least SFT numbers of cardinal neighbors of this display pixel are not making a graytone transition from white to white, or is flagged with the isColorImagePixel designator (i.e., this particular display pixel is a color pixel in the source image (or alternatively in the color mapped image)), then apply a F W→W transition waveform (e.g., FIG. 4A), see step 608; Else, in step 610, if all four cardinal neighbors of the display pixel have a next graytone of white, and at least one cardinal neighbor has a current graytone of not white and its prior pixel transition was empty, or at least on cardinal neighbor has a graytone transition of white-to-white and is flagged as isColorImagePixel, then apply a T W→W transition waveform (e.g., FIG. 4B), see step 612; else then apply an empty GL W→W transition waveform in step 614.

Figure 7:
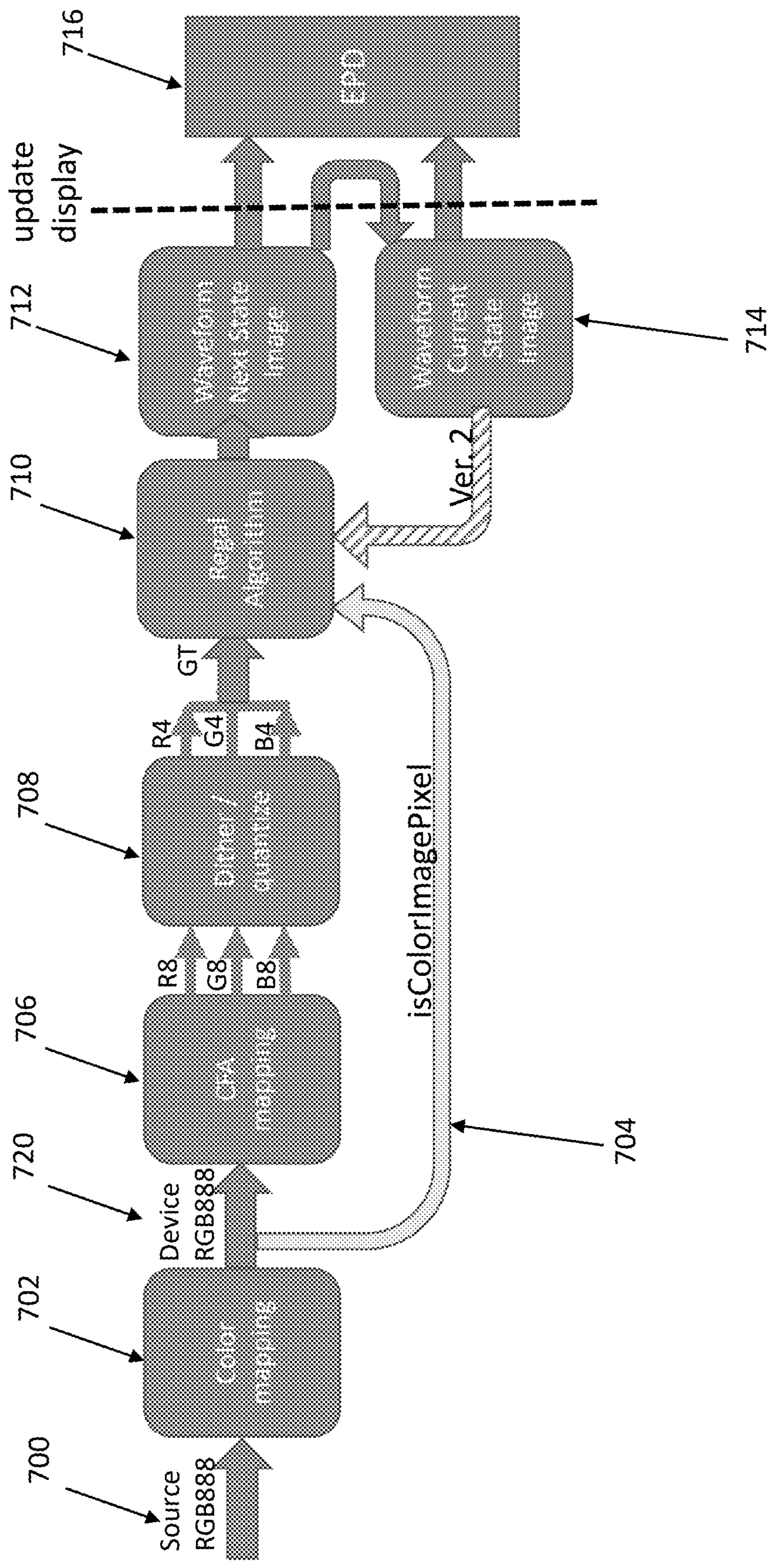
FIG. 7 illustrates a process for rendering images on a display.

In some embodiments, it is preferred that the identification of display pixels as color pixels and flagging them with the designator isColorImagePixel is to occur before an image is rendered to the display. Referring now to FIG. 7, identifying color pixels and flagging them with the designator "isColorImagePixel" 704 can happen before the quantization step 708, at a display controller capable of controlling the operation of a bistable electro-optic display. In operation, an image or a source image 700 may be first processed by a color mapping algorithm 702 associated with the controller. The color mapping algorithm 702 can be configured to process the source image 700 into a color mapped image 720 to be fit the colors available to the particular display, to achieve an optimal color visual effect on this particular display. Subsequently, color pixels in the color mapped image 720 may be identified and flagged as isColorImagePixel 704 and fed into the algorithm 710. It should be appreciated that this identification and flagging happens before the CFA mapping 706 step and the image dither and quantization 708 step. Subsequent using the algorithm 710 waveforms can be assigned to display pixels to display the image. Then at the waveform step 712, the waveforms for displaying the image 720 can be send to the EPD 716. In some embodiment, these waveforms 712 can be recycled back to the algorithm 710 to be used as input (i.e., waveform for the current state image 714) to generate the waveforms for the next image state.

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The invention claimed is:

1. A method for driving a color electrophoretic display including a color filter array between a viewer and an electrophoretic medium including black and white particles, the color electrophoretic display having a plurality of display pixels, the method comprising:
- color mapping a source image to a color mapped image for the color electrophoretic display;
- identifying color display pixels from the color mapped image and flagging the color display pixels with a designator;
- using the designator as input for a waveform generating algorithm for determining whether to apply a clearing waveform when transitioning color display pixels, wherein the clearing waveform applied to color display pixels flagged with the designator is a full clearing white-to-white transition waveform; and
- applying one or more twiddle pulses to display pixels having all four cardinal neighbors with a next graytone of white and at least one cardinal neighbor that is a color display pixel flagged with the designator.

2. The method of claim 1 further comprising performing a color filter array mapping on the color mapped image.

3. The method of claim 1 further comprising generating waveforms for a next state image from the waveform generating algorithm.

4. The method of claim 1 further comprising using the generated waveforms as current state image for a next state image.

5. The method of claim 1 wherein each twiddle pulse comprises repeating sets of one frame of a positive 15 volt pulse and one frame of a negative 15 volt pulse.

6. A method for driving a color electrophoretic display including a color filter array between a viewer and an electrophoretic medium including black and white particles, the color electrophoretic display having a plurality of display pixels, the method comprising:
- color mapping a source image to a color mapped image for the color electrophoretic display;
- identifying color display pixels from the source image and flagging the color display pixels with a designator;
- using the designator as input for a waveform generating algorithm for determining whether to apply a clearing waveform when transitioning color display pixels, wherein the clearing waveform applied to color display pixels flagged with the designator is a full clearing white-to-white transition waveform; and
- applying one or more twiddle pulses to display pixels having all four cardinal neighbors with a next graytone of white and at least one cardinal neighbor that is a color display pixel flagged with the designator.

7. The method of claim 6 further comprising performing a color filter array mapping on the color mapped image.

8. The method of claim 6 further comprising generating waveforms for a next state image from the waveform generating algorithm.

9. The method of claim 6 further comprising using the generated waveforms as current state image for a next state image.

10. The method of claim 6 wherein each twiddle pulse comprises repeating sets of one frame of a positive 15 volt pulse and one frame of a negative 15 volt pulse.

* * * * *